(12) United States Patent
Kruger et al.

(10) Patent No.: US 6,577,099 B2
(45) Date of Patent: Jun. 10, 2003

(54) METHOD AND APPARATUS FOR PROVIDING AND STORING POWER IN A VEHICLE

(75) Inventors: Duane D. Kruger, Fishers, IN (US); Georgette N. Young, Noblesville, IN (US); Stephen W. Moore, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/849,578

(22) Filed: May 4, 2001

(65) Prior Publication Data

US 2002/0171390 A1 Nov. 21, 2002

(51) Int. Cl.[7] ............................................. H01M 10/46
(52) U.S. Cl. ...................................................... 320/104
(58) Field of Search ................................ 320/103, 104, 320/117, 126, 128, 135, 136, 137

(56) References Cited

U.S. PATENT DOCUMENTS

| | | | |
|---|---|---|---|
| 5,081,365 A | | 1/1992 | Field et al. .................... 290/45 |
| 5,568,038 A | * | 10/1996 | Tatsumi |
| 5,670,266 A | | 9/1997 | Thomas et al. ................ 429/3 |
| 5,675,234 A | * | 10/1997 | Greene |
| 5,896,022 A | * | 4/1999 | Jacobs, Sr. |
| 5,916,699 A | | 6/1999 | Thomas et al. ................ 429/3 |
| 6,044,922 A | | 4/2000 | Field ......................... 180/65.2 |
| 6,275,001 B1 | * | 8/2001 | Dierker |

* cited by examiner

Primary Examiner—Edward H. Tso
(74) Attorney, Agent, or Firm—Margaret A. Dobrowitsky

(57) ABSTRACT

A vehicle having an electric hybrid power system is provided. A battery pack stores electricity to power the electric motor. The battery pack includes a first plurality of batteries connected in parallel with a second plurality of batteries. The first plurality of batteries are Nickel Metal Hydride (NiMH), and the second plurality of batteries provide high power output at lower temperatures. In addition, the second plurality of batteries may also have a low energy density.

16 Claims, 5 Drawing Sheets

METHOD AND APPARATUS FOR PROVIDING AND STORING POWER IN A VEHICLE

CROSS REFERENCE TO RELATED APPLICATIONS

This application it is related to U.S. Pat. Nos. 5,081,365 and 6,044,922, the contents of which are incorporated herein by reference thereto.

TECHNICAL FIELD

The present invention relates to energy storage systems for a vehicle and in particular to a battery system for a hybrid vehicle.

BACKGROUND

Hybrid electric vehicles employ an internal combustion engine and an electric motor which can alternatively, or in conjunction, provide a driving force for a vehicle.

There are several types of electric propulsion systems for vehicles. For example, a pure electric drive vehicle, a series hybrid system, a parallel hybrid system, and a combined series-parallel hybrid system are just a few of the designs currently being considered.

One common factor of all these designs is that there is a need for a high-efficiency, battery storage system.

Since many of the functions of the hybrid electric vehicle involve charging the batteries and then using this energy at a later time, the performance of the hybrid system is highly dependant on the performance of the battery. The choice of a battery to meet all requirements is critical. As with any design, many factors are involved in choosing the best technology to meet the requirements. Some of these factors are: performance, cost, weight, volume, and thermal characteristics, etc.

Some hybrid electric vehicle configurations replace the standard starting and generating systems of the vehicle with higher power, higher performance hybrid components. Therefore, finding an energy source system that meets the hybrid vehicle's rigorous requirements is one the greatest challenges facing this technology.

Some of the factors that are associated with the energy storage system requirements are: power capability, energy capacity, life, cost, volume, mass, and temperature characteristics etc.

Nickel metal hydride (NiMH) batteries have become an attractive technology for many automobile manufacturers. NiMH batteries have high power capabilities, long life, lightweight, and have high packaging efficiency. However, NiMH batteries also have some drawbacks when compared to other battery technologies. NiMH batteries are expensive and have decreased performance at lower temperatures.

Since it is a requirement that the battery system provide enough power to start an engine at low temperatures, it is desirable to have a battery system which includes NiMH batteries while also accommodating the shortfalls of NiMH battery output at low temperatures.

SUMMARY OF THE INVENTION

The proposed solution to the NiMH cold temperature problem is to supplement the NiMH battery system with a secondary battery system. The preferred supplemental battery system is a battery having high cold cranking power. One example of a proposed supplemental battery is a Lead Acid (PbA) battery having spiral wound thin film technology.

When these two battery technologies are connected together in parallel, they complement each other in their respective weak areas of operation.

At cold temperatures, the NiMH's internal resistance increases greatly while the PbA does not increase significantly. The resulting effect is that the PbA battery will stabilize the voltage of the battery system and supply the required current to start the engine. After the current transient, current is now traded from the NiMH battery to the PbA battery because of the disparity between the internal voltage potentials of each battery. This in effect will not allow the PbA battery to experience deep discharge, and therefore will increase its operating life.

At warmer temperatures, the NiMH battery will stabilize the voltage of the battery system during regenerative braking and absorb the majority of the regenerative braking energy. This will protect the PbA battery, as it will not allow the voltage to rise to a point where the PbA battery is in danger of damage.

During deeper discharge cycles, the NiMH battery voltage remains relatively constant vs. State of Charge (SOC). This allows the energy to be drawn from the NiMH battery while leaving the PbA battery at a high SOC.

In conclusion, the PbA battery helps the NiMH battery meet the cold performance requirements, and the NiMH keeps the PbA battery at a consistently high SOC to increase its life.

The above-described and other features and advantages of the present invention will be appreciated and understood by those skilled in the art from the following detailed description, drawings, and appended claims.

DESCRIPTION OF THE PREFERRED EMBODIMENT

Figure 1:
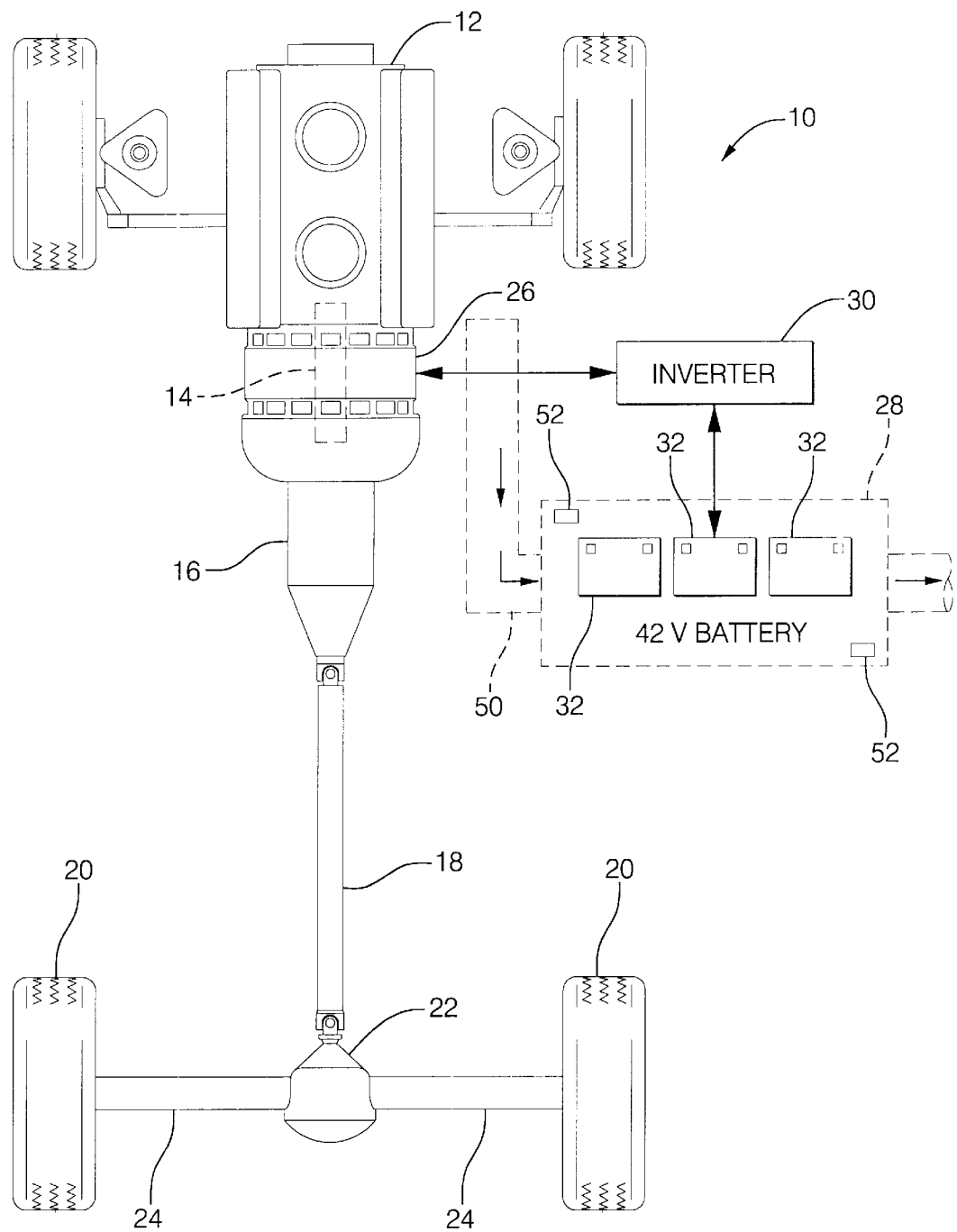
FIG. 1 is a schematic illustration of a propulsion system of a hybrid vehicle.

Referring now to FIG. 1, a vehicle propulsion system 10 is illustrated. Vehicle propulsion system 10 is a hybrid vehicle, and is but one application of the method and apparatus disclosed herein.

Vehicle propulsion system 10 includes an internal combustion engine 12. Internal combustion engine 12 provides a driving force to a crankshaft 14 in a known manner. Crankshaft 14 is coupled to a transmission 16. Transmission 16 houses a plurality of gears for providing a driving force to a drive shaft 18 in a known manner. Drive shaft 18 ultimately provides a driving force to at least one road wheel 20 through the use of a differential 22 and axles 24.

An electric machine 26 is coupled to crankshaft 14. In an exemplary embodiment, electric machine 26 is located intermediate to internal combustion engine 12 and transmission 16. Of course, the location of electric machine 26 may vary. Preferably, electric machine 26 is a motor/generator device capable of either providing a driving force to crankshaft 14 or generating a source of electrical energy by applying a torque force to the crankshaft. The generation of electrical energy is accomplished by a method referred to as "regenerative braking".

In a driving mode, a battery pack 28 provides a source of electrical power to motor 26 through an inverter 30. In addition, battery pack 28 also provides a source of power for the vehicle's accessories, such as lights, radio, HVAC system, etc.

In a regenerative braking mode, battery pack 28 receives an electrical charge from electric machine 26 through inverter 30.

In an exemplary embodiment, battery pack 28 comprises a plurality of batteries 32.

Figure 2:
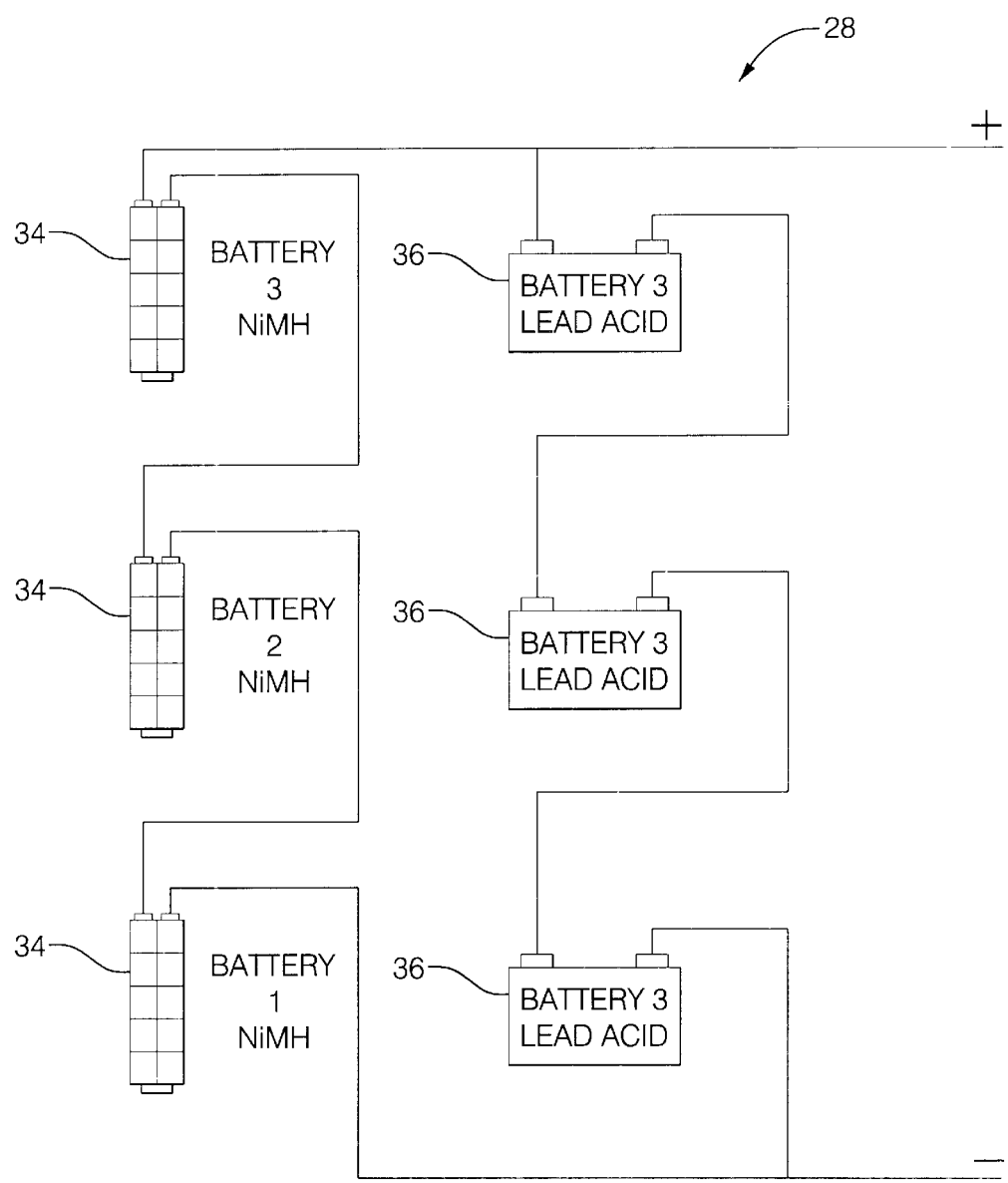
FIG. 2 is a schematic illustration of a battery pack constructed in accordance with an exemplary embodiment of the present invention.

Referring now to FIG. 2, battery pack 28 is illustrated schematically. Battery pack 28 is a 42 Volt battery pack. Of course, and as applications may require, the voltage and configuration of battery pack 28 may vary. Battery pack 28 includes a plurality of batteries 32 connected to each other in parallel.

Batteries 32 comprise a plurality of nickel metal hydride batteries 34 connected in parallel with a plurality of lead acid batteries 36. In an exemplary embodiment, three-nickel metal hydride batteries are connected in parallel with three lead acid batteries. Each NiMH battery has ten 1.2 volt cells for each 12 volt lead acid battery. The number of cells and their configuration may vary. For example, NiMH batteries can also be packaged using 30 separate cells. Just for illustrative purposes 10 cells are shown packaged together in FIG. 2. This illustrates the same 12 volt potential of a PbA battery.

Since many of the functions of the hybrid electric vehicle involve charging the batteries, and then using this energy at a later time, the performance of the hybrid system is highly dependant on the performance of the battery.

One of the most promising technologies is the Nickel Metal Hydride (NiMH) battery technology. Most automakers are considering the use of NiMH in their hybrid applications. It meets many of the requirements except cost and cold temperature performance.

At cold temperatures, the NiMH batteries' internal resistance increases greatly. Thus, NiMH batteries alone will not be able to meet the cold weather power demands of the hybrid vehicle. In addition, NiMH batteries are expensive when compared to other alternatives.

The parallel configuration of nickel metal hydride batteries (NiMH) 34 and lead acid batteries 36 solves the problem of poor power output of the NiMH batteries at colder temperatures.

The proposed solution to the cold temperature problem is to have a battery system wherein a plurality of NiMH batteries are connected in parallel with a plurality of lead acid (PbA) batteries. Thus, at cold temperatures, the PbA batteries will supply a sufficient amount of cranking power.

At cold temperatures, the NiMH batteries' internal resistance increases greatly, while the PbA does not increase significantly. The resulting effect is that the lead acid batteries will stabilize the voltage of the battery system and supply the required power for current transients.

One proposed lead acid battery is the spiral wound thin film technology. These batteries have very high power density but very low energy storage capability. Thus, a PbA battery has some major deficiencies when operating alone. It has a very poor life expectancy when the battery experiences deep discharges. This situation, in particular, is difficult to avoid due to the low energy capability of the battery. It also has poor power capturing ability during regenerative braking, and therefore cannot meet the hybrid vehicle's demands alone.

Other battery technologies can be employed to supplement the NiMH batteries at colder temperatures. The PbA battery is just one type having a high power output at colder temperatures. Thus, and in accordance with an exemplary embodiment of the invention, it is contemplated that the NiMH batteries can be connected in parallel to other battery technologies which complement the operational deficiencies of the NiMH battery system.

Thus, when these two battery technologies are connected together in parallel, they complement each other in their respective weak areas of operation.

Figure 4:
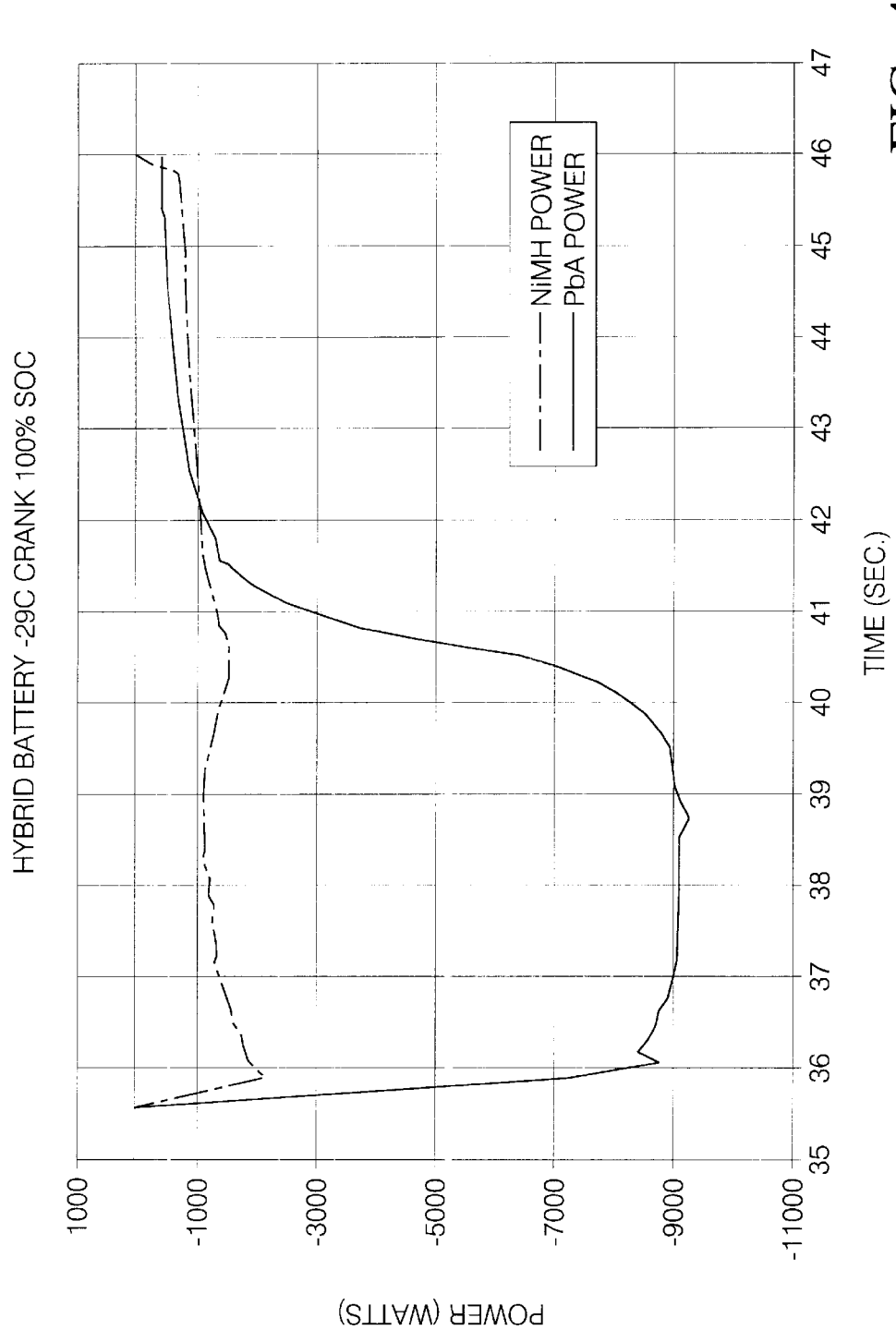
FIG. 4 is a graph illustrating power supplied by nickel metal hydride batteries and lead acid batteries at 100% state of charge during an engine cranking operation at −29° Celsius.

For example, and at a cold start, when the vehicle operator turns the key or other means for starting the engine, there is a voltage drop in the vehicle's batteries. Since the internal resistance of the nickel metal hydride batteries is so high, the lead acid batteries supplements the power necessary to start the internal combustion engine of the vehicle (FIG. 4).

After the start has occurred, there is an internal voltage disparity between the lead acid batteries and the nickel metal hydride batteries. This is due to the fact that the lead acid batteries have lost their charge in order to start the vehicle. As the vehicle operates the NiMH batteries supply an increased current to the depleted lead acid batteries. Therefore, the lead acid batteries are always maintained at a high state of charge. Thus, the lead acid batteries have a longer life because they are prevented from becoming deeply discharged.

After the start event, current is traded from the nickel metal hydride battery to the lead acid battery because of the disparity between internal voltage potentials of each battery. This in effect will not allow the lead add battery to discharge, and therefore increases its operating life.

In addition, the lightweight lead acid batteries also provide an additional source of power and storage medium for current acceptance during regenerative braking. However, the additional source of power and current storage medium is at a much smaller scale than that provided by the nickel metal hydride batteries. Moreover, the contribution of the lead acid batteries in this manner reduces the overall requirement for nickel metal hydride batteries in the battery pack of a hybrid vehicle. Accordingly, the costs associated with the same are reduced as a lesser amount of more expensive nickel metal hydride batteries are required for the vehicle's battery pack.

Another advantage of the parallel configuration of the PbA batteries and NiMH batteries is that overcharging of the PbA batteries is avoided. In particular, and at warmer temperatures, the NiMH batteries will stabilize the voltage of the battery system during regenerative braking and absorb the majority of the regenerative braking energy. This will protect the lead acid battery, as it will not allow the voltage to rise to a point where the lead acid battery is in danger of damage.

NiMH batteries can absorb much higher currents thus meeting the power demands of the vehicle at a reasonable voltage.

During deeper discharge cycles, the nickel metal hydride battery voltage remains relatively constant versus a state of charge (SOC). This allows energy to be drawn from the nickel metal hydride battery while leaving the lead acid battery at a high state of charge.

In conclusion, the lead acid battery helps the nickel metal hydride battery meet the cold performance requirements, and the nickel metal hydride battery keeps the lead acid battery constantly at a high state of charge to increase its life.

The MIT consortium has proposed voltage levels of 42 volts for the conventional vehicle; a strong effort to maximize the potential of this higher power is being seen in the development of the 42-volt hybrid electric vehicle.

Thin film PbA battery technology allows low volume, low mass, and great low temperature discharge capability. Thus, there is a manufacturing advantage since there is a reduced volume, and therefore the battery pack is easier to package in the vehicle.

The hybrid pack also allows a cost reduction over a pure NiMH pack by reducing the amount of NiMH batteries required and supplementing them with PbA batteries.

Also, at higher temperatures, the PbA batteries receive and supply power. Thus, inclusion of PbA batteries reduces the amount of NiMH batteries necessary to meet the system requirements, and accordingly, reduces the overall cost of the battery pack.

The lead acid batteries use a thin film technology that provides high power with a low energy density. These lead acid batteries with a high power output do not have a lot of active materials to store energy, and therefore have low storage capabilities. This, however, is supplemented by the NiMH batteries. Of course, the PbA spiral thin film batteries are but one type of PbA batteries contemplated for use with the present invention.

There are no separate electronics needed to connect the battery pack, since the batteries are connected in parallel and the voltage limits of both battery technologies are the same.

Since the batteries are connected in parallel, and if during charging, one battery gets more charge than the other battery, there will be a current trade-off between each battery until equilibrium is reached.

In an exemplary embodiment, the hybrid pack which includes NiMH and thin film batteries weighs 86 pounds including case and all other hardware. A lead acid battery pack using a robust PbA battery weighs 150 pounds.

Thermal management is more important in hybrid vehicles. The battery pack, and in particular the NiMH batteries, operate with increased efficiency at an ambient temperature similar to an optimal temperature for the interior vehicle compartment.

Accordingly, one desirable location of battery pack 28 is in close proximity to the internal cabin of the vehicle which is heated and/or cooled depending upon the exterior temperature of the vehicle.

Another alternative is to route the exhaust plenum 50 of the vehicle's HVAC system to cause the exhausted air to pass through and over the battery pack prior to its exiting of the internal compartment of the vehicle.

Therefore, the inside passenger cabin air that is exhausted out of the vehicle can be configured to pass through the location of the battery pack, or alternatively, the battery pack can be placed within the cabin compartment of the vehicle. Accordingly, this will help to maintain the temperature of the battery pack at a more desirable temperature.

A plurality of sensors 52 are used to measure the temperature and state of charge of the batteries of the battery pack.

Figure 3:
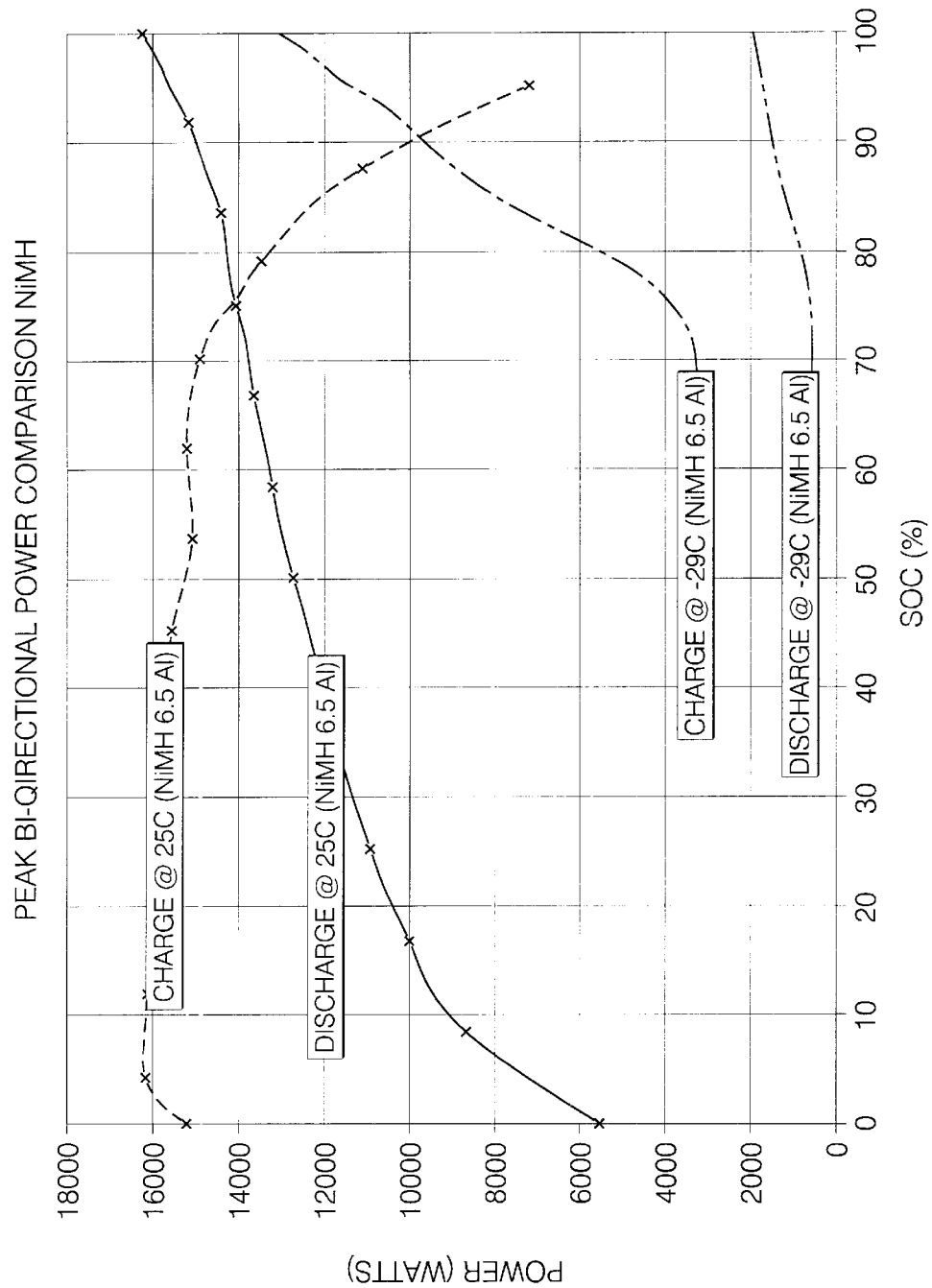
FIG. 3 is a graph illustrating a temperature performance comparison of nickel metal hydride batteries at two different temperatures.

Referring now to FIG. 3, the performance comparisons of the nickel metal hydride batteries is illustrated with respect to temperature variations. Here, the charge and discharge of the nickel metal hydride batteries is tested at two temperature values: 25° Celsius and −29° Celsius. It is noted that the performance of the nickel metal hydride batteries is adversely affected at the colder temperature (−29° Celsius).

Referring now to FIG. 4, the performance comparisons of the NiMH batteries vs. PbA batteries is illustrated for cold engine cranking at −29° Celsius with a 100% state of charge (SOC).

Figure 5:
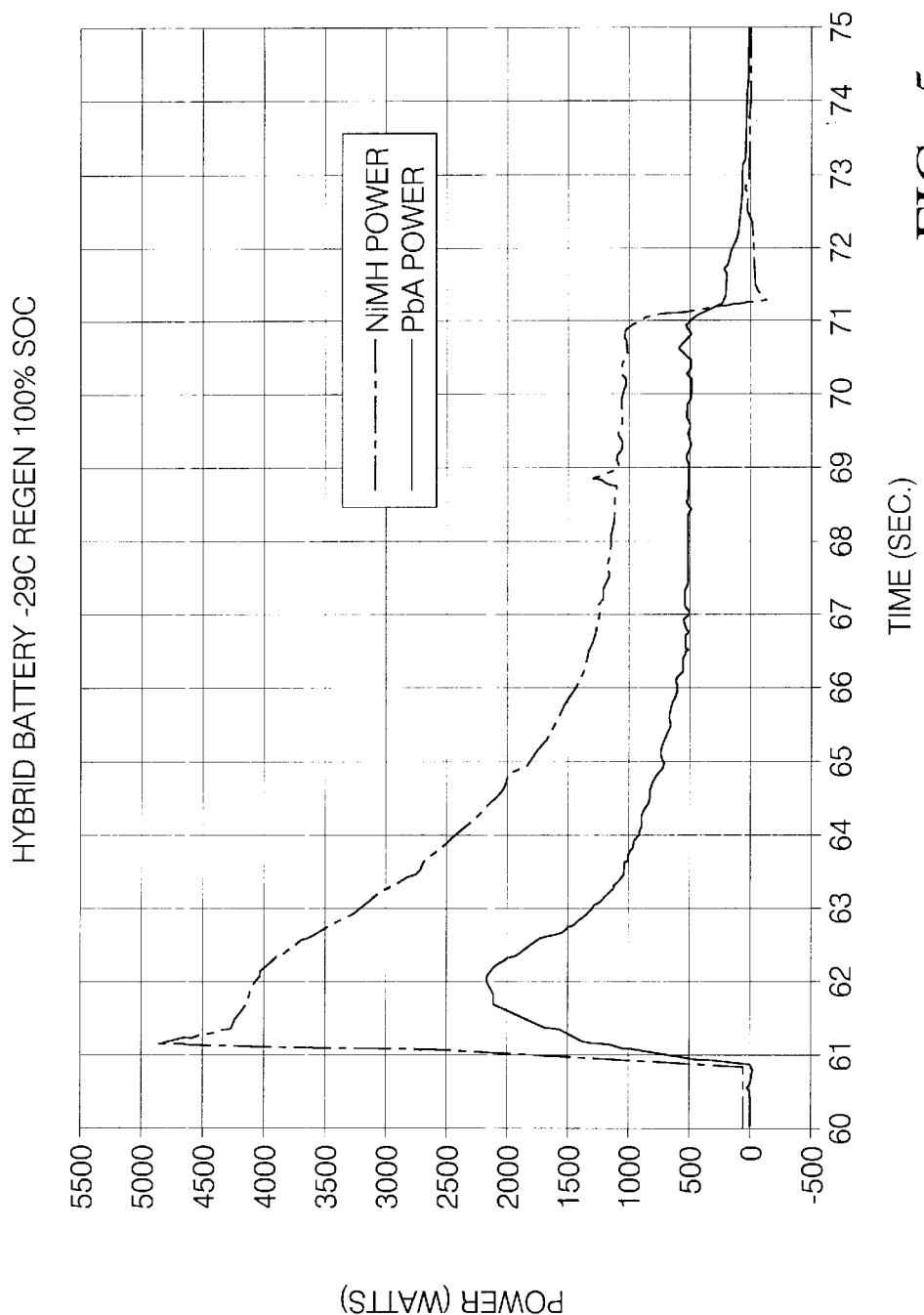
FIG. 5 is a graph illustrating regenerative braking at 100% state of charge and −29° Celsius.

Referring now to FIG. 5, the performance comparisons of the NiMH batteries vs. PbA batteries is illustrated for cold regenerative braking at −29° Celsius with a 100% state of charge (SOC).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power supply for a vehicle, comprising:
   a plurality of first batteries; and
   a plurality of second batteries being connected in parallel with said plurality of first batteries, said plurality of first batteries and said plurality of second batteries being configured to provide and receive a source of power from an electric machine; and
   wherein said electric machine is a motor/generator being configured, dimensioned, and positioned to provide either a negative or positive torque force to a vehicle drivetrain.

2. A power supply as in claim 1, wherein said first plurality of batteries are nickel metal hydride batteries and said second plurality of batteries are thin film lead acid batteries.

3. A power supply as in claim 1, wherein said first plurality of batteries are thirty nickel metal hydride cells, each having a 1.2-volt output, and said second plurality of batteries are three thin film lead acid batteries, each having a 12-volt output.

4. The power supply as in claim 1, wherein said vehicle is a hybrid vehicle.

5. The power supply as in claim 1, further comprising:
   an inverter for converting AC power to DC power, said inverter being electrically coupled between said motor/generator and said electric storage medium.

6. A power supply for a vehicle, comprising:
   a plurality of first batteries, said plurality of first batteries being nickel metal hydride;
   a plurality of second batteries being connected in parallel with said plurality of first batteries to form an electric storage medium, said plurality of first batteries and said plurality of second batteries being configured to provide and receive a source of power from an electric machine, said electric machine providing either a driving force or a stopping force to at least one ground engaging drive wheel of said vehicle, wherein said second plurality of batteries are capable of providing high power output at colder temperatures; and wherein said electric storage medium is in fluid communication with an exhaust plenum of said vehicle's heating, ventilation and air-conditioning system.

7. The power supply as in claim 6, wherein said second plurality of batteries are lead acid batteries.

8. The power supply as in claim 6, wherein said electric storage medium weighs less than ninety pounds and is configured for use with a 42 volt system.

9. The power supply as in claim 6, wherein said second plurality of batteries is maintained at a high state of charge.

10. The power supply as in claim 6, wherein said second plurality of batteries has a low energy density with respect to said first set of batteries.

11. A power supply as in claim 6, wherein said plurality of second batteries provides higher output at lower temperatures with respect to said plurality of first batteries, said plurality of second batteries being connected in parallel with said plurality of first batteries.

12. A power supply as in claim 11, wherein said first plurality of batteries are nickel metal hydride batteries and said plurality of second batteries are lead acid batteries.

13. The power supply as in claim 6, wherein said plurality of first batteries maintains said plurality of second batteries at a high state of charge.

14. The power supply as in claim 6, wherein said first temperature is about −29 degrees Celsius.

15. The power supply as in claim 14, wherein said plurality of second batteries provides about 9000 watts of energy during an engine cranking event, while said plurality of first batteries provides about 2000 watts of energy during said engine cranking event, when the power supply has a state of charge of about 100 percent.

16. The power supply as in claim 6, wherein said plurality of second batteries absorbs about 2100 watts of energy during said regenerative braking event, while said plurality of first batteries receives about 4900 watts of energy during said regenerative braking event, when the power supply has a state of charge of about 100 percent.

* * * * *